(12) United States Patent
Chheda et al.

(10) Patent No.: US 8,832,268 B1
(45) Date of Patent: Sep. 9, 2014

(54) NOTIFICATION AND RESOLUTION OF INFRASTRUCTURE ISSUES

(75) Inventors: Mahendra M. Chheda, Sammamish, WA (US); Shawn E. Heidel, Everett, WA (US); Robert B. Jaye, Sammamish, WA (US); Justin K. Brindley-Koonce, Seattle, WA (US); Adam N. Alexander, Dublin (IE)

(73) Assignee: Amazon Technologies, Inc., Reno, NV (US)

(*) Notice: Subject to any disclaimer, the term of this patent is extended or adjusted under 35 U.S.C. 154(b) by 169 days.

(21) Appl. No.: 13/587,796

(22) Filed: Aug. 16, 2012

(51) Int. Cl.
  *G06F 15/16* (2006.01)
  *G06F 15/173* (2006.01)
(52) U.S. Cl.
  USPC ......... 709/224; 709/223; 705/7.36; 705/7.22; 705/7.38
(58) Field of Classification Search
  USPC .......................................................... 709/224
  See application file for complete search history.

(56) References Cited

U.S. PATENT DOCUMENTS

| | | | |
|---|---|---|---|
| 7,225,250 B1 | 5/2007 | Harrop | |
| 7,355,758 B2 | 4/2008 | Desai | |
| 7,366,989 B2 | 4/2008 | Naik et al. | |
| 7,426,654 B2 * | 9/2008 | Adams et al. | 714/4.3 |
| 7,478,422 B2 * | 1/2009 | Valente et al. | 726/4 |
| 7,536,595 B1 | 5/2009 | Hiltunen et al. | |
| 7,809,703 B2 * | 10/2010 | Balabhadrapatruni et al. | 707/705 |
| 7,889,847 B2 | 2/2011 | Gainsboro | |
| 7,984,073 B1 * | 7/2011 | Basiago et al. | 707/802 |
| 8,032,626 B1 | 10/2011 | Russell et al. | |
| 8,095,880 B2 * | 1/2012 | Dieberger et al. | 715/736 |
| 8,177,634 B2 | 5/2012 | Herrmann et al. | |
| 2002/0093527 A1 * | 7/2002 | Sherlock et al. | 345/736 |
| 2004/0010586 A1 * | 1/2004 | Burton et al. | 709/224 |
| 2007/0186174 A1 | 8/2007 | Horikiri | |
| 2009/0222555 A1 * | 9/2009 | Qian et al. | 709/224 |
| 2010/0050079 A1 | 2/2010 | Thompson | |
| 2010/0332992 A1 * | 12/2010 | Donoho et al. | 715/736 |
| 2011/0050079 A1 * | 3/2011 | Hayama et al. | 313/310 |
| 2011/0154330 A1 * | 6/2011 | Axnix et al. | 718/1 |
| 2011/0276688 A1 * | 11/2011 | Qian et al. | 709/224 |
| 2012/0166945 A1 | 6/2012 | Roberts et al. | |
| 2012/0221955 A1 | 8/2012 | Raleigh et al. | |
| 2012/0278485 A1 * | 11/2012 | Qian et al. | 709/224 |

OTHER PUBLICATIONS

U.S. Appl. No. 13/587,772, filed Aug. 16, 2012, Titled: Preemptive Notification of Infrastructure Issues.

* cited by examiner

*Primary Examiner* — Tauqir Hussain
(74) *Attorney, Agent, or Firm* — Kilpatrick Townsend & Stockton, LLP

(57) ABSTRACT

Embodiments of the present disclosure are directed to, among other things, providing notifications of distributed system infrastructure issues that may affect customers. In some examples, a web service may utilize or otherwise control a client instance to control, access, or otherwise manage resources of a distributed system. Based at least in part on determining a health level of the distributed system and receiving operating information from multiple sources, notifications may be provided. Additionally, in some examples, one or more remediation operations may be performed automatically or provided as recommendations.

18 Claims, 10 Drawing Sheets

NOTIFICATION AND RESOLUTION OF INFRASTRUCTURE ISSUES

CROSS REFERENCES TO RELATED APPLICATIONS

The present application is related to application Ser. No. 13/587,772, filed on the same day herewith, entitled, "PREEMPTIVE NOTIFICATION OF INFRASTRUCTURE ISSUES," the entire contents of which is hereby incorporated by reference as if fully set forth herein, under 35 U.S.C. §120.

BACKGROUND

Customers of data storage services, web services and/or distributed computing systems may deploy, instantiate or otherwise implement one or more distributed computing resources. For example, a customer may set up a website by requesting that particular resources of a distributed system be deployed by the distributed system to operate the website. However, because the distributed system itself may control or manage the computing resources on behalf of and/or remote from the customer, the customer may not always be aware of causes for service disruption or degraded service. Additionally, customers or other users may provide comments regarding known or potential issues with the distributed system based at least in part on observations of the system. However, many customers may still remain unaware of various issues or problems with the distributed system that may affect computing resources operating on their behalf. Additionally, these customers may not be aware of potential actions that may be performed to remediate the issues.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
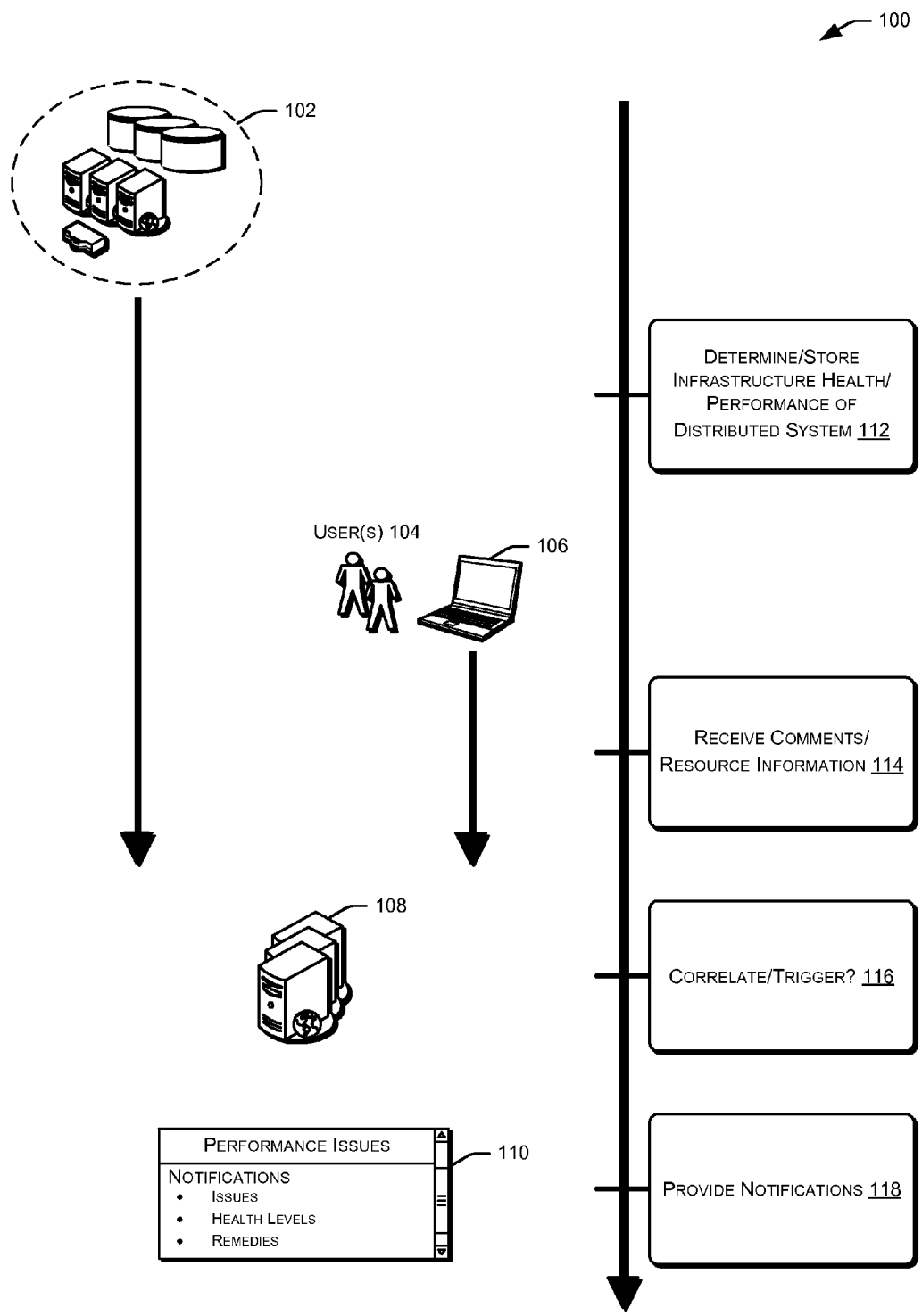
FIG. 1 illustrates an example architecture for implementing the notification and/or resolution of distributed system issues that includes a service provider computer, one or more user devices and at least one distributed computing system, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing notifications and/or resolution options associated with resource issues and/or infrastructure issues of distributed computing systems (e.g., web services, cloud systems, etc.). In some examples, web service client entities (also referred to as users) or customers may utilize or otherwise control a computing resource (e.g., a client entity) of a service provider (i.e., a distributed system) to control, access, or otherwise manage distributed resources. As used herein, a client entity may include one or more virtual machine instances configured to receive user requests, perform instructions and/or access data of a distributed computing system (e.g., provided by the distributed system and acting on behalf of a client or user of the system). In some aspects, the service provider may provide storage, access and/or placement of one or more computing resources through a service such as, but not limited to, a web service, a cloud computing service or other network based data management service. For example, a user or client entity may access, via the service provider, data storage and/or data management such that access mechanisms may be implemented and/or provided to the client entity utilizing the computing resources. In some examples, computing resource services, such as those provided by the service provider, may include one or more computing resources accessible across one or more networks through user interfaces (UIs), application programming interfaces (APIs) and/or other interfaces where the one or more computing resources may be scalable and/or expandable as desired. Further, in some examples, a client entity (also referred to as a third-party.

In some examples, the computing resources may be server computer systems in a distributed computing environment. Other computing resources are considered as being within the scope of the present disclosure, some examples of which are provided below. Additionally, in some examples, infrastructure and/or distributed resource issues may be assessed, determined or otherwise identified based at least in part on monitoring infrastructure components and/or customer resources, receiving notifications from monitoring services and/or receiving comments or other notifications from users, customers or other observers of the distributed system. For example, a service provider (e.g., the distributed system itself) or a third-party monitoring service may monitor distributed system infrastructure components. Examples of infrastructure components may include, but are not limited to, switches, power circuits, machine hosts, servers, data centers, geographic regions, racks, instances or network interfaces of the distributed system. As such, health information (e.g., a health level, a probability of failure, etc.) may be determined and/or stored for each infrastructure component and/or for groups of infrastructure components. In some aspects, notifications may be provided and/or automatic remediation may be performed based at least in part on the health information.

Additionally, in some aspects, a user or client may access a client entity of a distributed system for attaching data sets, data volumes, data blocks or the like to the client entity for accessing, manipulating and/or processing the data by the client entity. That is, a client entity may request that particular data volumes be operationally attached to the client entity. In some aspects, operationally attaching data volumes may include generating, storing, maintaining and/or updating a mapping of data stored in the data volume such that the client entity may perform input and/or output (I/O) operations on the data. For example, data may be read from the attached data volume and/or written to the attached data volume by the client entity. According to some examples, data volumes that are attached may be stored in a relatively low latency type of memory such that the I/O operations performed on the data may be performed in a faster (i.e., lower latency) fashion.

Data volumes that are attached to client instances (i.e., client entities or virtual machine instances), in some examples, may be stored in one or more primary memory spaces (e.g., low latency memory) or in one or more backup memory spaces (e.g., high latency memory, durable memory and/or other low latency memory). In some cases, the attached data volumes may be stored in both primary memory spaces and backup memory spaces. In this way, one or more layers of redundancy may help protect from data loss or corruption. Additionally, in some aspects, a user or client entity may request to detach a data volume when, for example, the user or client entity may not plan to access or otherwise perform input/output I/O operations on the data volume for a foreseeable amount of time. For example, a data volume may include resources for operating a seasonal website or other service that operates periodically. Alternatively, or in addition, the data volume may include resources for application development that may be complete or otherwise no longer needed. As such, it may not be desirable to maintain attachment to the client entity at all times. Further, in some examples, a client instance may be taken down, removed or otherwise deactivated such that it is no longer operational. In this case, attached data volumes may be detached as a matter of course. However, in some examples, although a data volume may be detached for one or more particular reasons, the data volume may continue to be stored in the low latency memory space and/or the backup memory space.

Client instances and/or data volumes may also be organized in clusters and/or in one or more separate geographic areas. Geographic areas may include regions and/or zones. In some examples, zones may be distinct locations that are configured to be insulated from failures in other zones and provide inexpensive, low latency connectivity to other zones in the same region. In some examples, a region may be defined as any collection of resources and may be independent of zones and/or physical locations. By launching client instances in separate zones, a customer may be able to protect applications from failure of a single location. In some examples, regions include one or more zones, may be geographically dispersed and may be in separate geographic areas or countries. For example, a group of servers or server farms located in separate cities, states, countries, continents, etc., may operate one or more client instances. That is, in some examples, a customer may request that the service provider spin up, or otherwise provision, multiple client instances; with at least one in the United States and another in Europe. In this way, if a location-specific event occurs that takes down the servers in Europe, subsequent requests for the resource could be routed to the servers in the U.S. Additionally, in this example, a load balancer and/or other controller could manage load and/or bandwidth issues at each instance, such that interruptions to the web service may be minimized.

As noted above, infrastructure components may be monitored (e.g., at regular, irregular or other intervals) for degradation, errors, irregularities or other disturbances in performance. Additionally, comments and/or feedback may be received via one or more channels or sources. For example, users and/or customers may report service outages, degradations, disruptions, etc. However, in order to filter out noise (e.g., when a customer reports a service problem that is actually caused by the customers' setup as opposed to a system problem), the service provider may correlate the received information with the monitored infrastructure data. For example, if one or more customers report that a data center is stuck (or otherwise not working properly), the service provider may initially assume that this information is noise. That is, the customers may be experiencing a phenomenon that is local to their implementation and is not actually an infrastructure issue. However, when correlated with infrastructure data (e.g., determined or otherwise monitored by the service provider or third-party monitoring service), the service provider may, instead, identify that an actual issue has occurred. This correlated information may, in some examples, act as a trigger (or triggering event). In some examples, triggering events may also include a determined health level above a predetermined level. For example, a particular number of errors associated with a resource in a particular amount of time, a particular number of instances not responding or a particular number of non-responsive requests to an instance may signal a poor health level. Based at least in part on the triggering event, the service provider may perform one or more actions.

In some examples, the performed actions may include, but are not limited to, notifying a user or customer of the potential infrastructure issue, posting information about the potential issue on a public forum or automatically performing remediative actions. For example, the service provider may automatically restart or re-deploy a customer instance and/or move data to a safer or more reliable location. The service provider may perform such automatic actions based at least in part on default settings of the service provider and/or customer settings based at least in part on input provided via user interface items (i.e., drop down boxes, box selections, etc.) of a dashboard (e.g., a preferences dashboard) or other interface. In some cases, the user configurations may be fully customizable and/or provided by the customer in a markup language format such as, but not limited to, the extensible markup language (XML). Notifications of issues may also be provided to customers via one or more of many different communication channels. For example, the service provider may transmit the notifications via a web interface (e.g., the preferences dashboard, a comments dashboard, a help screen or an issues interface), via text message, via email, via exposed APIs, via public boards (e.g., electronic bulletin boards or news platforms) or via third party messaging or social services (e.g., via a private or public message of a social website).

Additionally, in some aspects, a client entity (e.g., a third-party reseller) may access the resources of the service provider and repackage or otherwise resell associated services and/or resources to customers. In this way, the service provider may allow the third-party to rebrand or otherwise offer the resources to customers outside of the service provider's control. The third-party may or may not pay for the ability to repackage, resell and/or rebrand such services. Additionally, the service provider may provide callable application programming interface (API) functions to the third-party for accessing the notification and resolution services. For example, the third-party may request notification and/or resolution information from the service provider based at least in part on performing the API functions using customer parameters or the like. The notifications may then be resurfaced by the third-party to their customers as desired.

In other examples, or in conjunction with the above examples, the service provider may provide a user interface for customers to provide specific comments and/or questions regarding potential issues with the distributed system. For example, a user may notice degraded service with one or more electronic resources of the system and may activate a comments and/or help interface. Via the help interface, the service provider may provide general recommendations for remediating the issue being experienced by the user. However, the user may also be enabled to provide comments and/or ask questions. For example, the user may attempt to ask a question about services performed from a particular geographic location or about a resource being operated on a particular rack or associated with a particular switch. That is, the questions and/or comments may correspond to particular infrastructure components (e.g., hardware components) of the distributed system. In some examples, while the user is typing the question or comment, the service provider may, in real-time, scan or otherwise analyze the received text to determine relevant information. This scanned text may then be correlated, in real-time, with the infrastructure information already collected. In some examples, the service provider may collect the infrastructure information (e.g., based at least in part on the infrastructure component monitoring described above) in real-time as well. The correlation, again, may be utilized to filter out customer noise and validate the customer question. In some examples, a pop-up (or other real-time) interface may be surfaced as to indicate potential issues with the distributed system that may affect the particular customer.

The pop-up interface (or other user interface) may be configured to offer notifications specific to the customer and/or specific to the question being typed into the question/comment section of the help screen. Additionally, the service provider may also provide remediation options to the customer via the interface. By way of example only, real-time collection and/or analysis may include determinations based at least in part on information collected on an on-going and continuous basis and may not include knowledge base information. In other words, using a knowledge base, notification information regarding potential issues may be the same for each scenario. For example, if multiple customers are commenting about resource instances, a knowledge base answer may be the same for both customers. Alternatively, using real-time analysis of the user's input, the service provider may be able to provide more meaningful and appropriate notifications that correspond to immediately current issues, recently identified issues, issues associated with particular configurations of the user and/or issues associated with a particular question (e.g., a question about a current customer- or service provider-reported issue or a particular piece of hardware).

In some aspects, the service provider may collect data from live operation and/or static attributes of a client instance, application stack or other electronic resource of a distributed system. The data may be live (i.e., collected based at least in part on monitored operation and/or activities) or it may be static (i.e., collected based at least in part on the application stack as configured to be operated). The data may be stored for further analysis. Determined infrastructure issues may be provided to a user, customer, account holder, etc., that is associated with the application stack, client instance and/or web service application. Additionally, in some aspects, the service provider may make recommendations to the customer regarding ways in which the identified infrastructure issues may be avoided or otherwise mitigated. For example, the service provider may recommend that the customer deploy client instances in one or more additional regions or zones. Further, automatic mitigation may be performed based at least in part on health levels of components and/or user configurations. For example, when a health level of an instance is determined to be below a user-defined level (e.g., based at least in part on correlated infrastructure information and user comments), the service provider may automatically deploy the instance on a different server, in a different rack or in a different region, in some examples.

More specifically, a service provider computer, such as a server operated by a financial institution, an online merchant, a news publication company, a web services company, a social networking company, or the like, may maintain and/or backup data volumes for one or more client entities of a distributed computing system. The service provider computer may also receive requests to backup data volumes associated with the client entities, to attach and/or detach data volumes to the client entities and/or to utilize other resources and/or services of the service provider. Additionally, in some examples, the service provider may receive, determine and/or otherwise collect statistical information associated with the resource (e.g., client entities, data volumes) and/or services in order to perform the notification and/or resolution of infrastructure issues.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 depicts an illustrative flow 100 in which techniques for notification and/or resolution of distributed system issues may be implemented. In illustrative flow 100, one or more computing resources of a distributed system 102 may operate together, in some cases operatively attached to one another via one or more networks. For example, the distributed system 102 may include a switch, a router, a network interface device, one or more computing devices, servers and/or data storage devices. Additionally, the distributed system 102 may also include physical hosts, host operating systems (OSs), racks of physical hosts or the like. Other devices may also be part of the distributed system 102. Additionally, in illustrative flow 100, one or more users 104 may operate one or more user devices 106 for communicating with the distributed system 102. The one or more user devices 106 may communicate with the distributed system 102 via one or more networks and/or via one or more service provider computers 108. Further, in some cases, the one or more service provider computers 108 such as, but not limited to, servers, server farms, etc. may be configured to implement the described techniques for notification and/or resolution of infrastructure issues. In some cases, the one or more service provider computers 108 may be part of the distributed system 102 (e.g., one of the distributed system 102 components). Additionally, the service provider computers 108 may be configured to provide a user interface 110 such as, but not limited to, a notification interface, a preferences dashboard, a help screen, a pop-up interface or the like for providing notifications to users 104 and/or for receiving questions/comments from users 104.

In some examples, the flow 100 may begin at 112, where the distributed system 102 may transmit operational information associated with infrastructure components to the service provider computers 108. In some examples, this information may be pushed to the service provider computers 108. However, in other examples, the service provider computers may periodically monitor the distributed system 102 such that the information may be pulled, requested or otherwise obtained without the distributed system 102 directly pushing the information. The service provider computers 108 may store this infrastructure performance information. Additionally, in some examples, the service provider computers 108 may utilize the performance information to determine health levels for one or more of the infrastructure components being monitored. Health levels may be indicated by color (e.g., red, yellow or green) or may be as granular as desired (e.g., ten, hundreds, etc., levels).

At 114 of flow 100, the service provider computers 108 may receive resource information associated with the one or more users 104. For example, a user 104 may have an instance of the distributed system 102 implementing a web site for the user 104. In this example, the instance of the distributed system 102 may be considered associated with the user 104 because it is operating (e.g., receiving requests, providing web pages, accessing data, etc.) on behalf of the user 104. As such, the service provider computers 108 may monitor these resources and collect operational information (e.g., for which users 104 is this resource operating). Additionally, the service provider computers 108 may utilize this information to tailor the issue notification and/or resolution actions to each user 104. For example, if the instance operating on behalf of the user 104 is deployed in Europe, and an issue notification is available for servers in Asia, the resource information may be utilized to instruct the service provider computers 108 not to notify the user 104 of the issue in Asia. Additionally, in some aspects, the service provider computers 108 may also receive user comments associated with the resources at 114. For example, the service provider computers 108 may receive comments that indicate degraded service associated with the one or more resources. The comments may be received from one or more different sources and/or channels including, but not limited to, public bulletin boards or forums, text message, private or public messaging services, social media services and/or user interfaces provided by the service provider computers 108 (e.g., a comment screen, a preference dashboard, a help screen, etc.).

The service provider computers 108 may correlate the received information and/or wait for a triggering event at 116. That is, in some examples, the service provider computers 108 may utilize a correlation of the received and/or stored infrastructure information and the received comments and/or resource information to filter out user noise. Based at least in part on the correlated data, the service provider computers 108 may provide and/or prepare the notifications 110 at 118 of flow 100. Additionally, in some examples, the service provider computers 108 may wait on a triggering event, at 116, to provide the notifications 110. Triggering events may include, but are not limited to, infrastructure components being above a predetermined health level, customer comments being above a predefined number and/or the correlation of infrastructure information and user comments/resource information being above a predefined level of relation. Based at least in part on the triggering event, the service provider computers 108 may also provide and/or prepare the notifications 110 at 118 of flow 100. Further, in some examples, the notifications 110 may be provided at 118 based at least in part on a combination of the triggering event and the correlation results.

Figure 2:
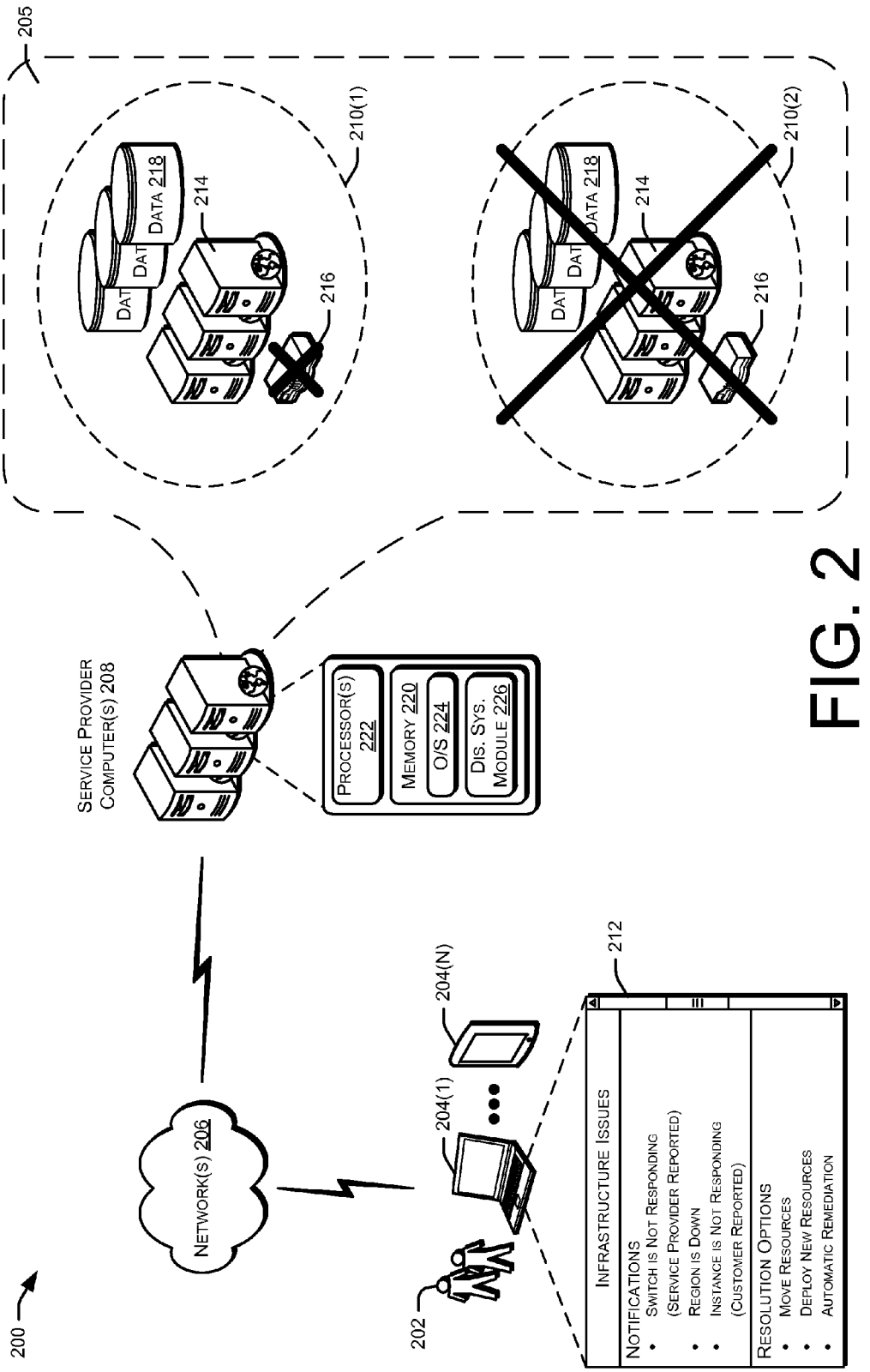
FIGS. 2 and 3 illustrate example block diagrams for describing at least some features of the notification and/or resolution of distributed system issues described herein, according to at least one example.

FIG. 2 depicts an illustrative system or architecture 200 in which techniques for notification and/or resolution of infrastructure issues may be implemented. In architecture 200, one or more users 202 (i.e., account holders) may utilize user computing devices 204(1)-(N) (collectively, user devices 204) to access a web service, or a distributed system 205, via one or more networks 206. In some aspects, the web service and/or the distributed system 205 may be hosted, managed and/or provided by a computing resources service or service provider, such as by utilizing one or more service provider computers 208. The one or more service provider computers 208 may, in some examples, provide computing resources and/or services such as, but not limited to, distributed computing services, resource instance instantiation, low latency data storage, durable data storage, data access, management, virtualization, etc. Additionally, distributed resources may be physically located in one or more geographic regions. For example, the service provider computers 208 manage or otherwise control one or more distributed sets 210(1)-(N) (collectively, distributed sets 210) in different geographic locations (e.g., distributed sub-system 210(1) may be located in Asia while distributed sub-system 210(2) may be located in Europe). Collectively, the distributed system 205 controlled by the service provider computers 208 may include all or a subset of the distributed sub-systems 210. In some aspects, a resource instance may be deployed and/or managed virtually and/or data volumes may be stored virtually within a distributed computing system 205 and/or distributed sub-system 210 operated by the one or more service provider computers 208. The one or more service provider computers 208 may also be operable to provide web hosting, computer application development and/or implementation platforms, combinations of the foregoing or the like to the one or more users 202.

In some examples, the networks 206 may include any one or a combination of many different types of networks, such as cable networks, the Internet, wireless networks, cellular networks, as well as other private and/or public networks. While the illustrated example represents the users 202 accessing the service provider computers over the networks 206, the described techniques may equally apply in instances where the users 202 interact with service provider computers 208 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the user devices 204 may interact with the service provider computers 208 such as to store, access and/or manage data, develop and/or deploy computer applications and/or host web content. The one or more service provider computers 208, perhaps arranged in a cluster of servers or as a server farm, may host the web service and/or the distributed system 205. Other server architectures may also be used to host the web service and/or distributed system. The service provider computers 208 may be capable of handling requests from many user devices 204 and serving, in response, various user interfaces that can be rendered at the user devices 104 such as, but not limited to, the notification console 212. The service provider computers 208 can host any type of website that supports user interaction, including social networking sites, online retailers, informational sites, blog sites, search engine sites, news and entertainment sites and so forth. As discussed above, the described techniques can similarly be implemented outside of the notification console 212, such as with other applications running on the user devices 204.

In some aspects, the service provider computers 208 may be any type of computing devices such as, but not limited to, mobile, desktop, thin-client and/or cloud computing devices, such as servers. In some examples, the service provider computers 208 may be in communication with the user devices 204, the computing devices of the distributed system 205 and/or the computing devices of the distributed sub-systems 210 via the networks 206, or via other network connections. The service provider computers 208 may include one or more servers, perhaps arranged in a cluster, as a server farm, or as individual servers not associated with one another. These servers may be configured to host a website (or combination of websites) viewable via the user devices 204 or a web browser accessible by a user 202.

The distributed system 205 and/or the distributed sub-systems 210 may be configured, but are not limited, to include servers 214, network interfaces and/or switches 216, data stores 218, racks of hosts, host operating systems, physical hosts, power circuits, data centers and/or entire regions of devices. Some distributed sub-systems 210 may contain all or a subset of each of these components or other components. Additionally, as used herein, infrastructure components may include any or all of the hardware and/or software resources of the distributed system 205 including, but not limited to, particular regions of sub-systems 210, sets of sub-systems 210 and/or portions of sub-systems 210. For example, receiving infrastructure component information may include receiving operational information associated with one or more servers 214 of the distributed sub-system 210(1).

In one illustrative configuration, the service provider computers 208 may include at least one memory 220 and one or more processing units (or processor(s)) 222. The processor(s) 222 may be implemented as appropriate in hardware, computer-executable instructions, firmware, or combinations thereof. Computer-executable instruction or firmware implementations of the processor(s) 222 may include computer-executable or machine-executable instructions written in any suitable programming language to perform the various functions described.

The memory 220 may store program instructions that are loadable and executable on the processor(s) 222, as well as data generated during the execution of these programs. Depending on the configuration and type of service provider computers 208, the memory 220 may be volatile (such as random access memory (RAM)) and/or non-volatile (such as read-only memory (ROM), flash memory, etc.). The service provider computers 208 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 220 may include multiple different types of memory, such as static random access memory (SRAM), dynamic random access memory (DRAM) or ROM.

The memory 220 and the additional storage, both removable and non-removable, are all examples of computer-readable storage media. Additional types of computer storage media that may be present in the service provider computers 208 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage, other magnetic storage devices or any other medium which can be used to store the desired information and which can be accessed by the service provider computers 208. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 208 may also contain communications connection(s) that allow the service provider computers 208 to communicate with a stored database, another computing device or server, user terminals and/or other devices on the networks 206. The service provider computers 208 may also include I/O device(s), such as a keyboard, a mouse, a pen, a voice input device, a touch input device, a display, speakers, a printer, etc.

Turning to the contents of the memory 214 in more detail, the memory 220 may include an operating system 224 and one or more application programs or services for implementing the features disclosed herein including a distributed system module 226. In some examples, the distributed system module 226 may be configured to maintain, or otherwise store, account information associated with requested resources, data and/or services (e.g., of the distributed system 205 and/or the distributed sub-systems 210. The account information may include account holder information, the user ID, the password, acceptable answers to challenge questions, etc. In some aspects, the distributed system module 226 may be configured to operate as a hypervisor or other virtualization system. For example, the distributed system module 226 may create, generate, instantiate or otherwise provide one or more resource instances (i.e., a virtual machine instance of the distributed system 205) to a user 202 by providing one or more guest operating systems that may operate on behalf of the user 202. That is, in some examples, the user 202 may operate a resource instance as if the operations were being performed by one or more processors of the user device 204. As such, the resource instance may be considered a client entity acting on behalf of the user 202 and/or accessing data, data sets, data volumes, data blocks, etc. (collectively, 218), of the distributed system 205.

Additionally, in some examples, the one or more service provider computers 208 may include one or more application programs or services for implementing additional features disclosed herein. In some examples, an application or module may be configured to implement, host or otherwise manage data stored in a data set 218. As noted above, in some aspects, a user 202 may make requests for attaching and/or detaching data sets 218 from one or more resource instances and/or for backing up data of the attached data volumes. For example, the user 202 may be an application programmer testing code using a resource instance and an attached data set of the service provider computers 208. In this non-limiting example, while the code is being tested, the user 202 may have the data set 218 attached to a resource instance of a server 214, and may request that one or more I/O operations be performed on the attached data set 218. During and/or after testing of the code, the user 202 may make one or more backup requests of the attached data set 218. However, in some examples, once the testing is complete, the user 202 may request that the attached data 218 set be detached from the resource instance.

Further, other operations and/or configurations utilizing the resource instance and/or the data set 218 may be envisioned, as desired, for implementing a web service on behalf of a user 202. For example, a user 202 may be a website owner using a resource instance and an attached data set 218 of a server 214 to host the website. In this non-limiting example, the data set 218 may be attached to the resource instance while the website is operational. Additionally, in some examples, multiple resource instances may be instantiated to host the website and each resource instance may be attached to the data set 218 or a plurality of data sets. Additionally, as discussed above, each resource instance may be hosted by servers 214 or server farms located in different physical regions, zones, locations, etc. (e.g., in each distributed sub-system 210).

Returning to the contents of the memory 220 in more detail, the distributed system module 226 may also be configured to monitor infrastructure components of the distributed system 205. By monitoring the infrastructure components, the service provider computers 208 may be able to determine health levels of particular components and underlying hardware and/or of software of the distributed system 205. In this way, the distributed system module 226 may able to determine when certain actions should be taken with respect to customer resources. Additionally, in some examples, the distributed system module 226 may store the received and/or determined information. The distributed system module 226 may also receive information associated with particular resources that correspond to users 202. For example, if a user 202 has deployed, via the service provider computers 208, a resource instance, the distributed system module 226 may receive information about this particular instance (e.g., with which users 202 it is associated). Further, the distributed system module 226 may also be configured to receive comments, questions and/or information associated with performance of the overall distributed system 205 or of particular resources. These comments, questions and/or information may be received by one or more channels including, but not limited to, social media services, messaging services, email services, text services, exposed APIs, etc. Once received, the distributed system module 226 may correlate the infrastructure component information with the received resource information to filter out noise. In some examples, correlating data may include determining and/or ranking relative relationships. For example, by correlating user complaints about slow data retrieval in Asia and infrastructure component information that indicates a possible data center issue in China, the distributed system module 226 may be able to determine an actual infrastructure issue.

In some examples, based at least in part on infrastructure issue determinations, the distributed system module 226 may provide one or more notifications to the user 202 via the notification console 212. Example notifications may include, but are not limited to, that a switch is not responding, that a region is down and/or that an instance is not responding. Additionally, in some examples, the notifications may indicate solely whether a customer's resources area affected or when a large radius of problems is affecting a customer's resources. As noted above, a region may be any defined collection of resources. Further, the notifications may indicate various levels of granularity regarding resources (e.g., from the rack level, to the top of rack switch level, all the way to the region level). As seen in FIG. 2, some notifications may indicate whether the issue was reported by the system or by a user. Further, in some examples, the notification console 212 may be configured to also provide resolution options. For example, resolution options may include, but are not limited to, moving resources to different servers, deploying new resources (e.g., to restart an instance) and/or automatically performing resolution. In some cases, the distributed system module 226 may automatically perform resolution based at least in part on a user's 202 configuration settings. For example, a user 202 may configure the service to move resources whenever any issue is determined. However, other configurations may allow for some level of health issues before performing remediative actions. For example, a user 202 may configure the service to only move resources after an instance or server 214 becomes "red" or has three or more reported problems or identified issues. Configurations of user 202 accounts may be fully customizable and may include checking boxes or selecting drop-down options (or other predetermined settings) as well as providing instructions to the service provider computers 208 (e.g., in the form of XML or other code).

In one non-limiting example, the service provider computers 208 and/or the distributed system module 226 may control distributed sub-systems 210(1) and 210(2), which may be located in separate geographic regions (e.g., identified by different area codes, zip codes, postal codes, etc.). In a first example, the switch 216 may become non-responsive and the distributed system module 226 may become aware of this problem based at least in part on the regular monitoring performed on the distributed sub-system 210(1). In another example, an entire distributed sub-system 210(2) (e.g., in a separate country) may go down or become non-responsive. However, in some examples, the distributed system module 226 may not provide a notification of users 202 until some triggering event occurs. For example, a triggering event may be based at least in part on user configurations, determined health levels, an amount of correlated data (e.g., above some level of confidence) or the like. For example, identification of a potential problem via monitoring the switch 216 along with at least one or more users 202 reporting problems with their system (e.g., when their system utilizes the switch 216) may be a triggering event. Thus, in this example, once enough reports of issues with the distributed sub-systems 210 are identified by the one or more reporting channels (social media, help lines, etc.), the distributed system module 226 may provide a notification to users 202. In some aspects, all users 202 may be notified of the infrastructure issues (e.g., on a public board or via some public messaging service). However, in other examples, only users 202 that are affected by the non-responsive switch 216 may be notified. In this case, the notifications may be via private messages and/or may only be provided once users 202 are logged in. Further, in some examples, the distributed system module 226 and/or the service provider computers 208 may contract with one or more private social media services to provide private messages to affected users 202 via the private social media service.

As noted above, the architecture 200 may include one or more user devices 204. The user devices 204 may also be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 208 via the networks 206, or via other network connections. While, the following description may regularly refer to interaction between the user devices 204 and the service provider computers 208, it is to be understood that any communication to or from the user devices 204 may be via any appropriate computing device, as desired.

In one illustrative configuration, the user devices 204 may include at least one memory and one or more processing units (or processor(s)). The memory may include an operating system and one or more application programs or services for implementing the features disclosed herein including at least the notification console 212, such as web browsers or dedicated applications (e.g., smart phone applications, tablet applications, etc.). The notification console 212 may be configured to receive, store and/or display a website or other interface for interacting with the service provider computers 208. Additionally, the memory may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user 202 provided response to a security question or a geographic location obtained by the user device 204.

In some examples, the users 202 may request that computing resources be allocated to instantiate a resource instances on behalf of the users 202. Further, the resource instances may then be physically or virtually attached to one or more data stores via interaction between the user 202 and the user device 204. Also utilizing the user device 204, in some examples, a user 202 may request that backup copies of attached data sets be stored in additional memory spaces. For example, a backup request may involve backing up one or more portions of data volumes or entire data volumes on behalf of the user 202. In some aspects, however, a backup request may involve only storing a backup of data that has changed within a data set since the last backup, or since creation of the data set. For example, if a first backup is performed that generates a backup of an entire data volume, a second backup (requested after only a few bytes of the volume have changed) may only back-up the particular few bytes of the volume that have changed. The user device 204 may also be configured to receive, organize, store and/or manage account settings and/or preferences. For example, configuration settings associated with how many instances to utilize, what network ports to open, whether to purchase reserved instances, locations, regions and/or zones in which instances and/or data should be hosted and/or stored, user-preferred security settings, load balancer settings, etc., may be received from, stored on behalf of and/or managed on behalf of the user and/or an account via the user device 204.

Figure 3:
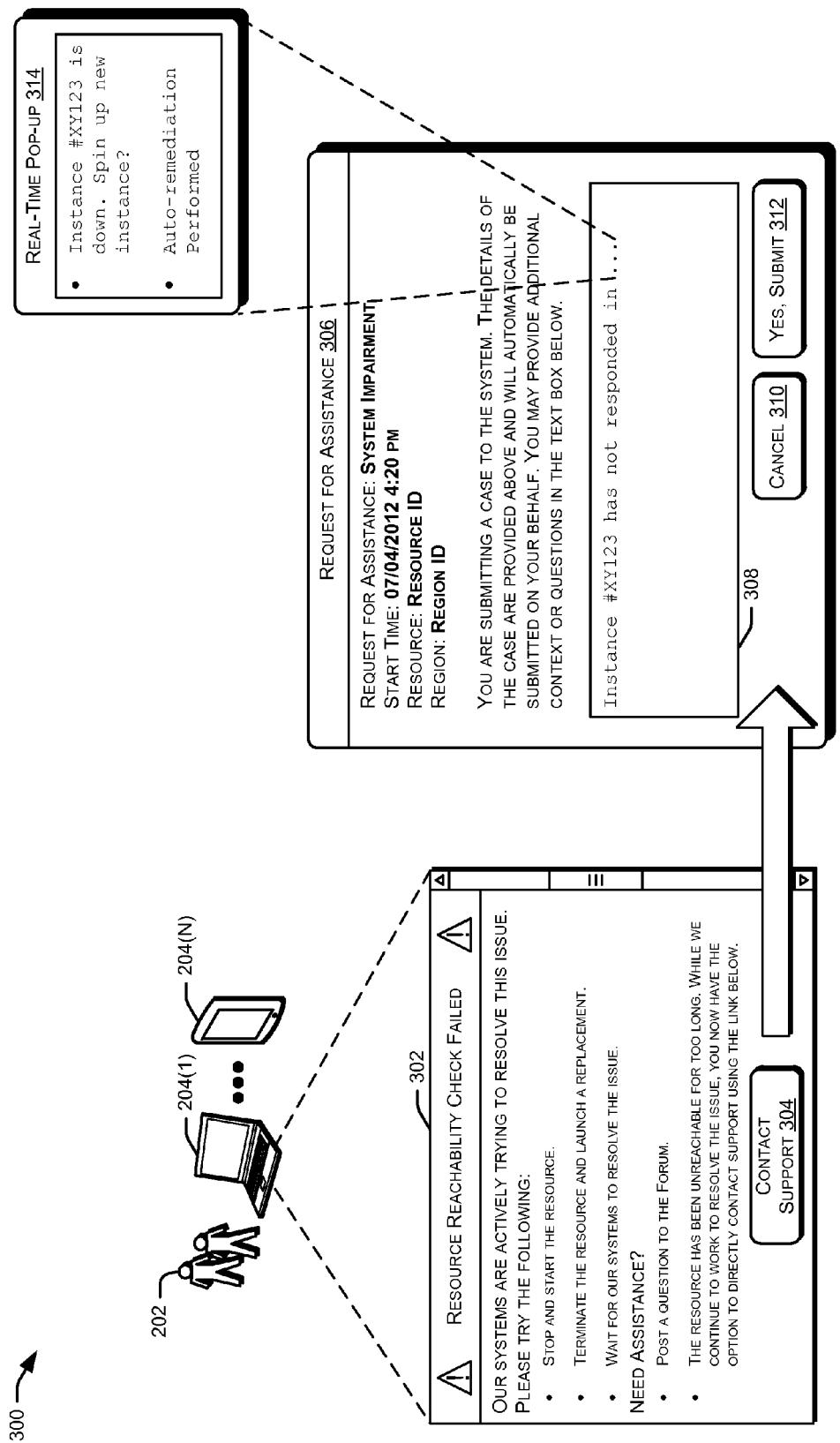

FIG. 3 depicts an illustrative system or architecture 300 in which additional features and/or techniques of the notification and/or resolution of infrastructure issues of FIGS. 1 and 2 are illustrated. In architecture 300, additional interfaces that may be surfaced to users 202 are illustrated. In some examples, the service provider computers 208 of FIG. 2 may prepare or otherwise provide theses interfaces to the user devices 204. In some examples, a user 202 may notice slow, non-responsive or otherwise degraded performance of one or more distributed resources. The user 202 may choose to report this problem to the distributed system module 226 of FIG. 2. In at least on non-limiting example, a help interface 302 may first be provided to offer general recommendations and/or options to the user. However, if the user 202 wishes to contact customer support and/or provide comments and/or questions regarding the degraded performance, the user 202 may select a contact support button 304. In some examples, based at least in part on selection of the contact support button 304, an assistance request interface 306 may be surfaced. Again, the service provider computers 208 and/or the distributed system module 210 of FIG. 2 may provide the assistance request interface 306. The assistance request interface 306 may act similar to a work order ticket or other request for services and, in some examples, may include particular information associated with the computing resource being monitored or reported. For examples, a resource ID and/or a region ID may be included in the interface 306 to identify the computing resource. The user 202 may also be provided with a text field 308 for entering questions/comments, a CANCEL button 310 and/or a YES, SUBMIT button 312. The CANCEL button 310 may be configured to close the assistance request interface 306 without submitting the questions/comments while the YES, SUBMIT button 312 may be configured to submit the questions/comments to the distributed system module 226 of FIG. 2, in some examples, opening a formal case, work order or service request.

In some examples, as noted above, the distributed system module 226 of FIG. 2 may be configured to monitor infrastructure component information (e.g., operational information) and/or social media or other data channels for potential issues with infrastructure components. Additionally, as noted above, the distributed system module 226 may correlate the received information to find relationships that indicate actual issues, thus potentially filtering out user or other noise. Further, in some examples, the distributed system module 226 may also scan the text field in real-time to receive and/or analyze text entered by the user 202. This text may then be correlated with the other received and/or stored information to determine and/or identify real-time notifications to be generated and/or presented to the user 202. In some examples, a real-time pop-up interface 314 may be surfaced prior to a user 202 finishing typing in the text field 308. The real-time pop-up interface 314 may provide real-time notifications corresponding to infrastructure issues that are related to the user's 202 questions/comments. The interface 314 may also indicate if and/or when automatic remediation is being performed (e.g., based at least in part on health levels and/or user 202 configuration settings, as described above). Further, in some examples, only public notifications may be provided in the real-time pop-up interface 314 when the user 202 is not logged in. However, if the user 202 is logged in, the interface 314 may be configured to provide more resource specific and/or private information, as well as public information, to the user 202.

Figure 4:
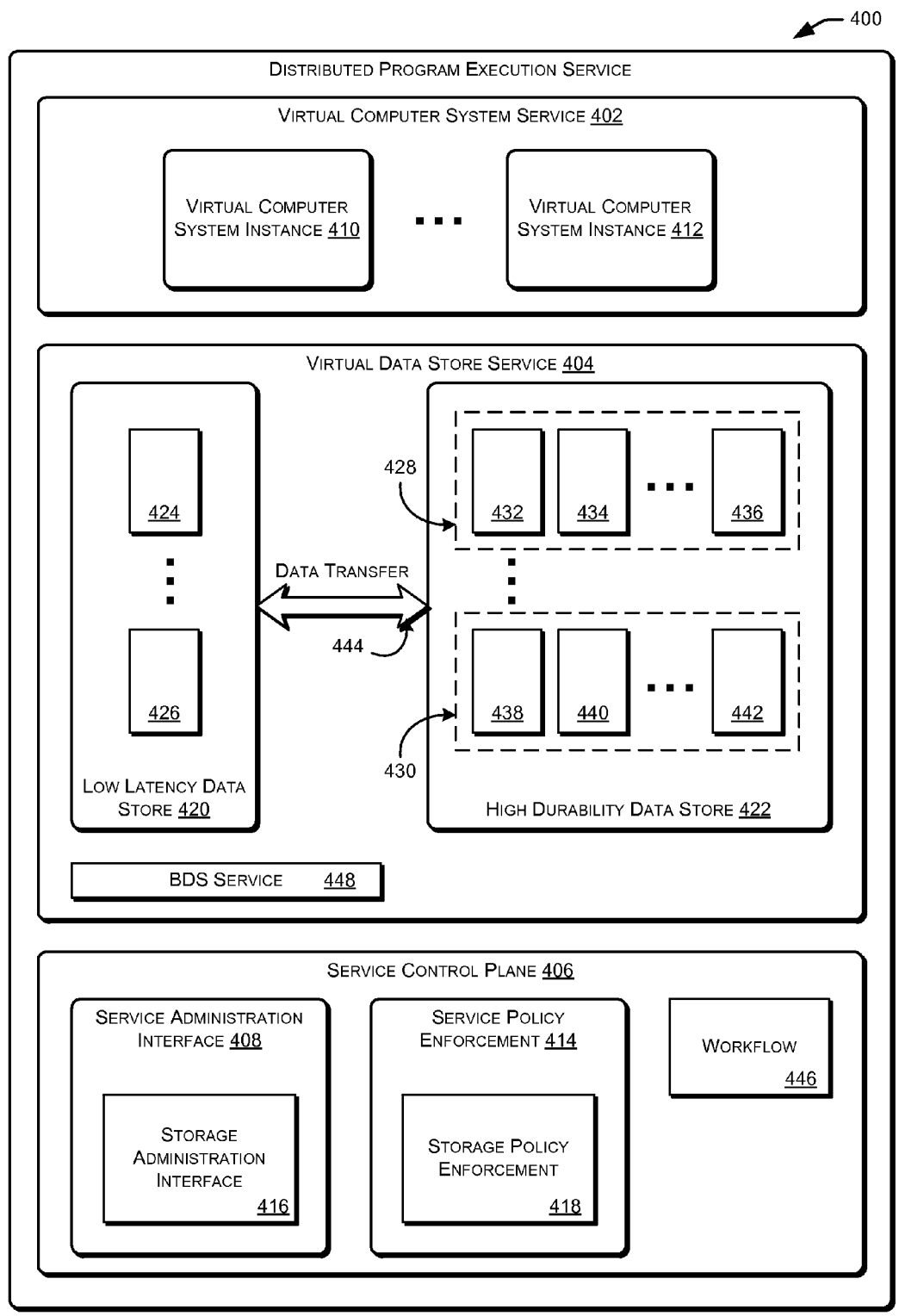
FIG. 4 illustrates an example architecture of a distributed program execution service that may be utilized to implement the notification and/or resolution of distributed system issues described herein, according to at least one example.

As noted, in at least one example, one or more aspects of the environment or architectures 100-300 of FIGS. 1-3 may incorporate and/or be incorporated into a distributed program execution service such as that hosted by the service provider computers 208 of FIG. 2. FIG. 4 depicts aspects of an example distributed program execution service 400 in accordance with at least one example. The distributed program execution service 400 may provide virtualized computing services, including a virtual computer system service 402 and a virtual data store service 404, with a wide variety of computing resources interlinked by a relatively high speed data network. Such computing resources may include processors such as central processing units (CPUs), volatile storage devices such as RAM, nonvolatile storage devices such as flash memory, hard drives and optical drives, servers such as the service provider computers 208 described above with reference to FIG. 2, one or more data stores such as the data set 218 of FIG. 2, as well as communication bandwidth in the interlinking network. The computing resources managed by the distributed program execution service 400 are not shown explicitly in FIG. 4 because it is an aspect of the distributed program execution service 400 to emphasize an independence of the virtualized computing services from the computing resources that implement them.

The distributed program execution service 400 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 400 may supply computing resources elastically and/or on-demand, for example, associated with a per resource unit commodity-style pricing plan.

The distributed program execution service 400 may further utilize the computing resources to implement a service control plane 406 configured at least to control the virtualized computing services. The service control plane 406 may include a service administration interface 408. The service administration interface 408 may include a web-based user interface configured at least to enable users and/or administrators of the virtualized computing services to provision, de-provision, configure and/or reconfigure (collectively, "provision") suitable aspects of the virtualized computing services. For example, a user of the virtual computer system service 402 may provision one or more virtual computer system instances 410, 412. The user may then configure the provisioned virtual computer system instances 410, 412 to execute the user's application programs. The ellipsis between the virtual computer system instances 410 and 412 (as well as with other ellipses throughout this disclosure) indicates that the virtual computer system service 402 may support any suitable number (e.g., thousands, millions and more) of virtual computer system instances although, for clarity, only two are shown.

The service administration interface 408 may further enable users and/or administrators to specify and/or re-specify virtualized computing service policies. Such policies may be maintained and enforced by a service policy enforcement component 414 of the service control plane 406. For example, a storage administration interface 416 portion of the service administration interface 408 may be utilized by users and/or administrators of the virtual data store service 404 to specify virtual data store service policies to be maintained and enforced by a storage policy enforcement component 418 of the service policy enforcement component 414. Various aspects and/or facilities of the virtual computer system service 402 and the virtual data store service 404 including the virtual computer system instances 410, 412, the low latency data store 420, the high durability data store 422 and/or the underlying computing resources may be controlled with interfaces such as application programming interfaces (APIs) and/or web-based service interfaces. In at least one example, the control plane 406 further includes a workflow component 446 configured at least to interact with and/or guide interaction with the interfaces of the various aspects and/or facilities of the virtual computer system service 402 and the virtual data store service 404 in accordance with one or more workflows.

In at least one embodiment, service administration interface 408 and/or the service policy enforcement component 414 may create, and/or cause the workflow component 446 to create, one or more workflows that are then maintained by the workflow component 446. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 408. As another example, a policy enforcement workflow may be created from a policy enforcement workflow template configured with parameters by the service policy enforcement component 414.

The workflow component 446 may modify, further specify, and/or further configure established workflows. For example, the workflow component 446 may select particular computing resources of the distributed program execution service 400 to execute and/or be assigned to particular tasks. Such selection may be based at least in part on the computing resource needs of the particular task as assessed by the workflow component 446. As another example, the workflow component 446 may add additional and/or duplicate tasks to an established workflow and/or reconfigure information flow between tasks in the established workflow. Such modification of established workflows may be based at least in part on an execution efficiency analysis by the workflow component 446. For example, some tasks may be efficiently performed in parallel, while other tasks depend on the successful completion of previous tasks.

The virtual data store service 404 may include multiple types of virtual data stores such as a low latency data store 420 and a high durability data store 422. For example, the low latency data store 420 may maintain one or more data sets 424, 426 which may be read and/or written (collectively, "accessed") by the virtual computer system instances 410, 412 with relatively low latency. The ellipsis between the data sets 424 and 426 indicates that the low latency data store 420 may support any suitable number (e.g., thousands, millions and more) of data sets although, for clarity, only two are shown. For each data set 424, 426 maintained by the low latency data store 420, the high durability data store 422 may maintain a set of captures 428, 430. Each set of captures 428, 430 may maintain any suitable number of captures 432, 434, 436 and 438, 440, 442 of its associated data set 424, 426, respectively, as indicated by the ellipses. Each capture 432, 434, 436 and 438, 440, 442 may provide a representation of the respective data set 424 and 426 at particular moment in time. Such captures 432, 434, 436 and 438, 440, 442 may be utilized for later inspection including restoration of the respective data set 424 and 426 to its state at the captured moment in time. Although each component of the distributed program execution service 400 may communicate utilizing the underlying network, data transfer 444 between the low latency data store 420 and the high durability data store 422 is highlighted in FIG. 4 because the contribution to utilization load on the underlying network by such data transfer 444 can be significant.

For example, the data sets 424, 426 of the low latency data store 420 may be virtual disk files (i.e., file(s) that can contain sequences of bytes that represent disk partitions and file systems) or other logical volumes. The low latency data store 420 may include a low overhead virtualization layer providing access to underlying data storage hardware. For example, the virtualization layer of the low latency data store 420 may be low overhead relative to an equivalent layer of the high durability data store 422. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 420 and the high durability data store 422, respectively, are substantially disjoint. In a specific embodiment, the low latency data store 420 could be a Storage Area Network (SAN) target or the like. In this exemplary embodiment, the physical computer system that hosts the virtual computer system instance 410, 412 can send read/write requests to the SAN target.

The low latency data store 420 and/or the high durability data store 422 may be considered non-local and/or independent with respect to the virtual computer system instances 410, 412. For example, physical servers implementing the virtual computer system service 402 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 410, 412 may have a validity lifetime corresponding to the virtual computer system instance 410, 412, so that if the virtual computer system instance 410, 412 fails or is de-provisioned, the local data is lost and/or becomes invalid. In at least one embodiment, data sets 424, 426 in non-local storage may be efficiently shared by multiple virtual computer system instances 410, 412. For example, the data sets 424, 426 may be mounted by the virtual computer system instances 410, 412 as virtual storage volumes.

Data stores in the virtual data store service 404, including the low latency data store 420 and/or the high durability data store 422, may be facilitated by and/or implemented with a block data storage (BDS) service 448, at least in part. The BDS service 448 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 448 may facilitate and/or implement local caching of data blocks as they are transferred through the underlying computing resources of the distributed program execution service 400 including local caching at data store servers implementing the low latency data store 420 and/or the high durability data store 422, and local caching at virtual computer system servers implementing the virtual computer system service 402. In at least one embodiment, the high durability data store 422 is an archive quality data store implemented independent of the BDS service 448. The high durability data store 422 may work with sets of data that are large relative to the data blocks manipulated by the BDS service 448. The high durability data store 422 may be implemented independent of the BDS service 448. For example, with distinct interfaces, protocols and/or storage formats.

Each data set 424, 426 may have a distinct pattern of change over time. For example, the data set 424 may have a higher rate of change than the data set 426. However, in at least one embodiment, bulk average rates of change insufficiently characterize data set change. For example, the rate of change of the data set 424, 426 may itself have a pattern that varies with respect to time of day, day of week, seasonally including expected bursts correlated with holidays and/or special events and/or annually. Different portions of the data set 424, 426 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 432 of the data set 424 may involve a substantially full copy of the data set 424 and transfer 444 through the network to the high durability data store 422 (may be a "full capture"). In a specific example, this may include taking a snapshot of the blocks that make up a virtual storage volume. Data transferred between the low latency data store 420 and high durability data store 422 may be orchestrated by one or more processes of the BDS service 448. As another example, a virtual disk (storage volume) may be transferred to a physical computer hosting a virtual computer system instance 410. A hypervisor may generate a write log that describes the data and location where the virtual computer system instance 410 writes the data. The write log may then be stored by the high durability data store 422 along with an image of the virtual disk when it was sent to the physical computer.

The data set 424 may be associated with various kinds of metadata. Some, none, or all of such metadata may be included in a capture 432, 434, 436 of the data set 424 depending on the type of the data set 424. For example, the low latency data store 420 may specify metadata to be included in a capture depending on its cost of reconstruction in a failure recovery scenario. Captures 434, 436 beyond the initial capture 432 may be "incremental," for example, involving a copy of changes to the data set 424 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 432, 434, 436 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 434, 436, utilization load on the underlying computing resources can be significantly less for incremental captures compared to full captures.

For example, a capture 432, 434, 436 of the data set 424 may include read access of a set of servers and/or storage devices implementing the low latency data store 420, as well as write access to update metadata, for example, to update a data structure tracking "dirty" data blocks of the data set 424. For the purposes of this description, data blocks of the data set 424 are dirty (with respect to a particular class and/or type of capture) if they have been changed since the most recent capture (of the same class and/or type). Prior to being transferred 444 from the low latency data store 420 to the high durability data store 422, capture 432, 434, 436 data may be compressed and/or encrypted by the set of servers. At the high durability data store 422, received capture 432, 434, 436 data may again be written to an underlying set of servers and/or storage devices. Thus each capture 432, 434, 436 involves a load on finite underlying computing resources including server load and network load. It should be noted that, while illustrative embodiments of the present disclosure discuss storage of captures in the high durability data store 422, captures may be stored in numerous ways. Captures may be stored in any data store capable of storing captures including, but not limited to, low-latency data stores and the same data stores that store the data being captured.

Captures 432, 434, 436 of the data set 424 may be manually requested, for example, utilizing the storage administration interface 416. In at least one embodiment, the captures 432, 434, 436 may be automatically scheduled in accordance with a data set capture policy. Data set capture policies in accordance with at least one embodiment may be specified with the storage administration interface 416, as well as associated with one or more particular data sets 424, 426. The data set capture policy may specify a fixed or flexible schedule for data set capture. Fixed data set capture schedules may specify captures at particular times of day, days of the week, months of the year and/or any suitable time and date. Fixed data set capture schedules may include recurring captures (e.g., every weekday at midnight, every Friday at 2 am, 4 am every first of the month) as well as one-off captures.

Illustrative Processes

FIGS. 5-9 illustrate example flow diagrams showing respective processes 500-900 for providing notification and/or resolution of infrastructure issues. These processes are illustrated as logical flow diagrams, each operation of which represents a sequence of operations that can be implemented in hardware, computer instructions or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any or all of the processes may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

Figure 5:
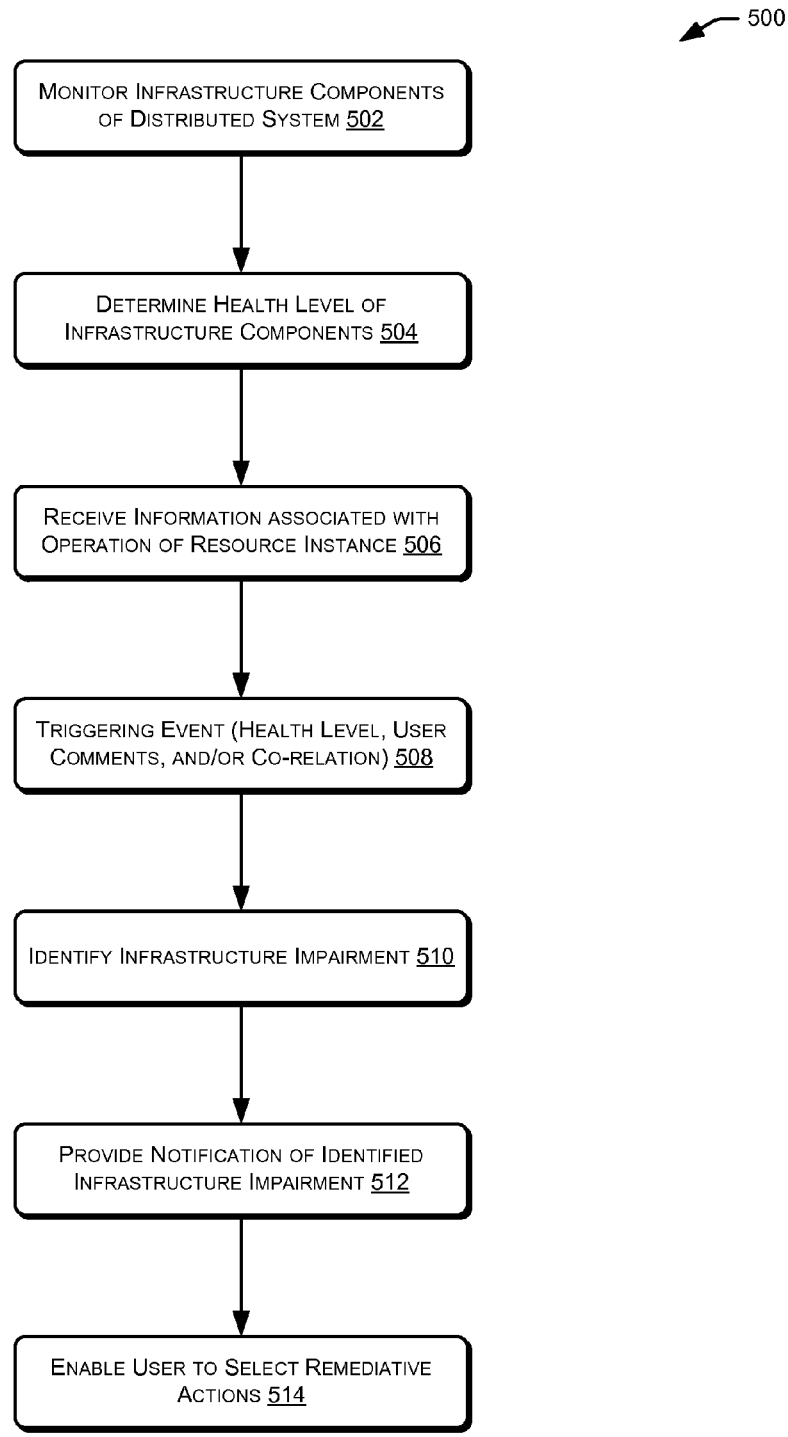
FIGS. 5-9 illustrate example flow diagrams of processes for implementing at least some features of the notification and/or resolution of distributed system issues described herein, according to at least a few examples.

In some aspects, the one or more service provider computers 208 shown in FIG. 2 may perform the process 500 of FIG. 5. The process 500 may begin by monitoring infrastructure components of a distributed system at 502. As noted, the infrastructure components may include, but are not limited to, physical hosts, host OSs, network interfaces, switches, power sources, racks, servers, data centers or regions of the distributed systems 205 and/or distributed sub-systems 210 of FIG. 2. Additionally, monitoring the components may include regularly polling the components, regularly receiving information from the components and/or regularly receiving information from a third-party monitoring service. At 504, the process 500 may determine a health level of the infrastructure components. In some examples, the health level may be based at least in part on the monitored or otherwise received performance information. The process 500 may also receive information associated with operation of a resource instance at 506. This information may, in some examples, be utilized by the service provider computers 208 to provide appropriate notifications (i.e., targeted notifications) to the users when notifications are provided. For example, if a notification that a particular physical region has gone down is to be provided, the information received at 506 may be utilized to identify the appropriate users to which to provide the notification. However, in other examples, the information received at 506 may be comments and/or questions received from one or more of a plurality of different channels. For example, this information may include feedback about performance of the system received from social media services, bulletin boards, web sites or the like.

At 508, the process 500 may determine whether a triggering event has occurred. In some examples, a triggering event may a health level, a user comment and/or a correlation between the health level, information received and/or stored based at least in part on the monitoring of infrastructure components and/or the user comments. The process 500 may also identify one or more infrastructure impairments or issues at 510. Again, these impairments and/or issues may be based at least in part on correlation information. At 512, the process 500 may provide a notification of an identified infrastructure issue to a user and/or to a group of users. The notifications may be private or public based at least in part on the medium, channel and/or whether the user is logged in. The process 500 may then end at 514 by enabling the user to select a remediative action. For example, the notification may include one or more resolution options that may be performed. Via a user interface, the user may select one or more of the resolution and/or remediative options. Alternatively, or in addition, certain resolution actions may be performed automatically based at least in part on user settings.

Figure 6:
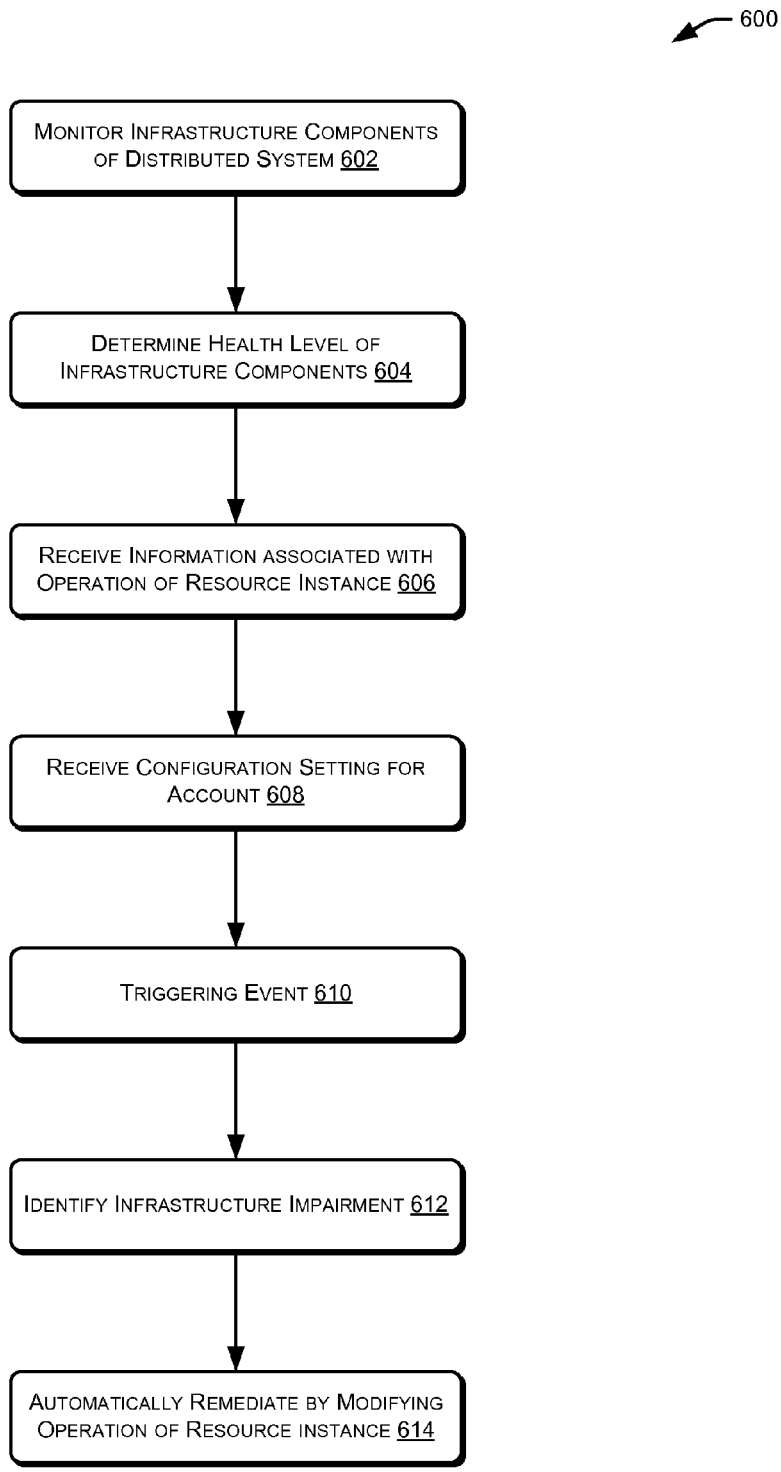

FIG. 6 illustrates an example flow diagram showing process 600 for providing notification and/or resolution of infrastructure issues. In some aspects, the one or more service provider computers 208 shown in FIG. 2 may perform the process 600 of FIG. 6. The process 600 may begin at 602 by monitoring infrastructure components of a distributed system (e.g., the distributed system 205 of FIG. 2). At 604, the process 600 may determine one or more health levels of the monitored infrastructure components based at least in part on operating information received via the monitoring. The process 600 may also receive information associated with operation of a resource instance at 606. Again, this information may be based at least in part on one or more input channels. At 608, the process 600 may receive a configuration setting for an account. This setting may be provided by and correspond to a user of the account. In some examples, the configuration settings provide instructions for how and/or when to take resolution actions. For example, the settings may indicate what triggering events should be used and/or at what level should the trigger occur. At 610, the process 600 may receive a triggering event. Once the triggering event occurs, the process 600 may identify one or more infrastructure impairments or issues at 612. The process 600 may then end at 614 by automatically remediating the infrastructure impairment identified at 612 by modifying operation of the resource instance. Additionally, in some examples, a notification of the infrastructure impairment may be provided to the user prior to or at relatively the same time as performing the remediative action.

Figure 7:
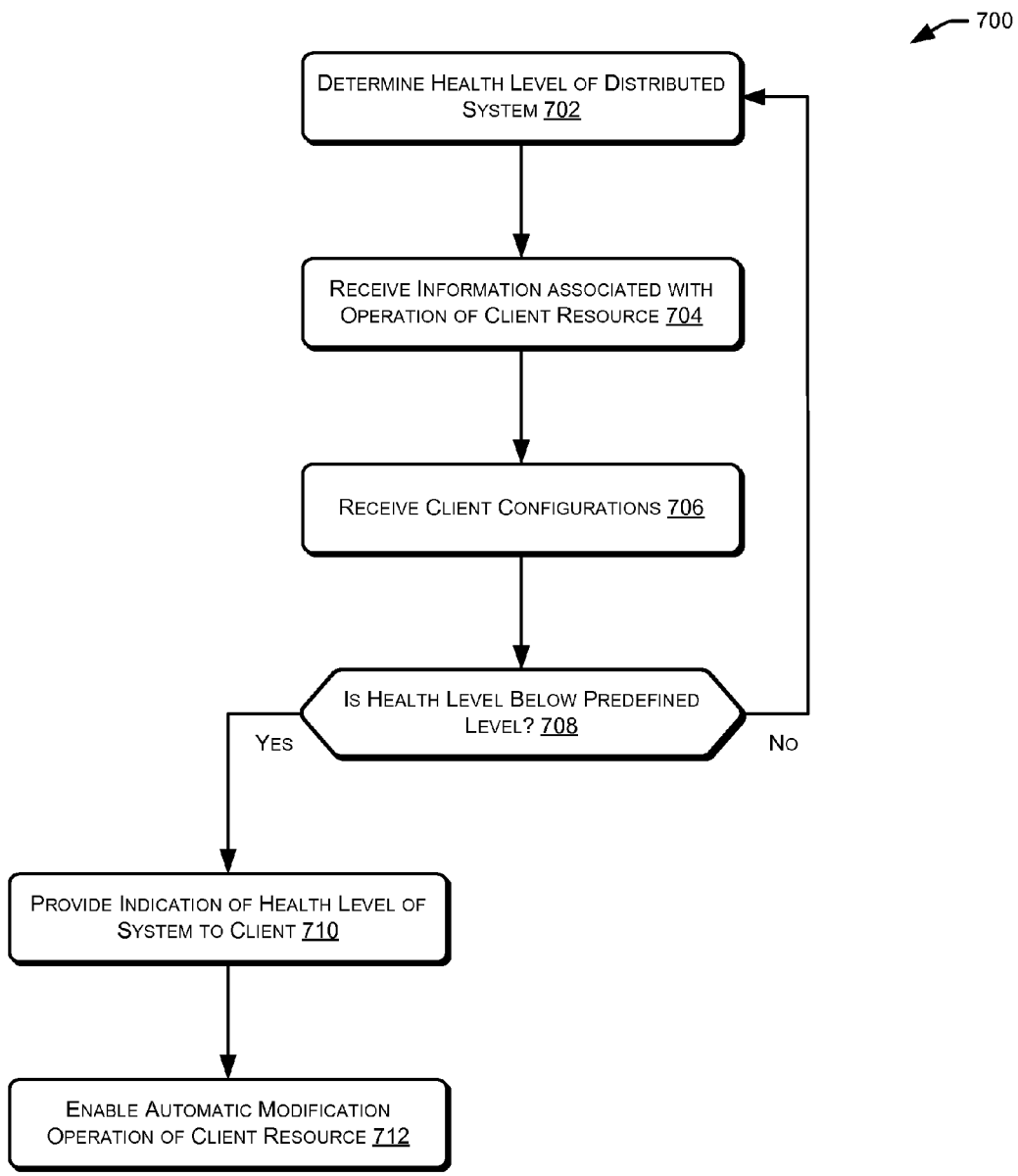

FIG. 7 illustrates an example flow diagram showing process 700 for providing notification and/or resolution of infrastructure issues. In some aspects, the one or more service provider computers 208 shown in FIG. 2 may perform the process 700 of FIG. 7. The process 700 may begin at 702 by determining a health level of a distributed system. In some cases, this may be determined based at least in part on monitoring components of the distributed system on regular and/or periodic intervals. At 704, the process 700 may receive information associated with operation of a client resource. In some examples, a client resource may include, but is not limited to, an instances, a data store, a rack, a hos OS, a load balancer, etc. The process may also receive a client configuration at 706. The client configuration may indicate user-defined settings for automatic resolution of identified issues. At 708, the process 700 may determine whether a health level is below a predefined level. That is, whether the overall health of the system or of a particular component and/or resource is healthy. In some examples, health levels below a predefined level indicate that the system and/or the resource is unhealthy (i.e., an issue) and that remediative actions should be taken before data and/or service are lost.

If it is determined at 708 that the health level is not below a predefined level (i.e., that the system and/or resource is healthy), the process 700 may return to 702 to determine the health level of the system. In this way, the health level may be regularly assessed such that each time the process 700 attempts to determine whether the health level is below the predefined level, the process 700 will have the most current information. Alternatively, if the process 700 determines at 708 that the health level is below the predefined level (i.e., an issue), the process 700 may provide an indication of the health level to a user at 710. The process 700 may also end at 712 by enabling automatic modification operations of the client resource to resolve or otherwise remediate the determined issues. As noted above, the automatic modification, remediation and/or resolution may be based at least in part the user configuration settings from 706.

Figure 8:
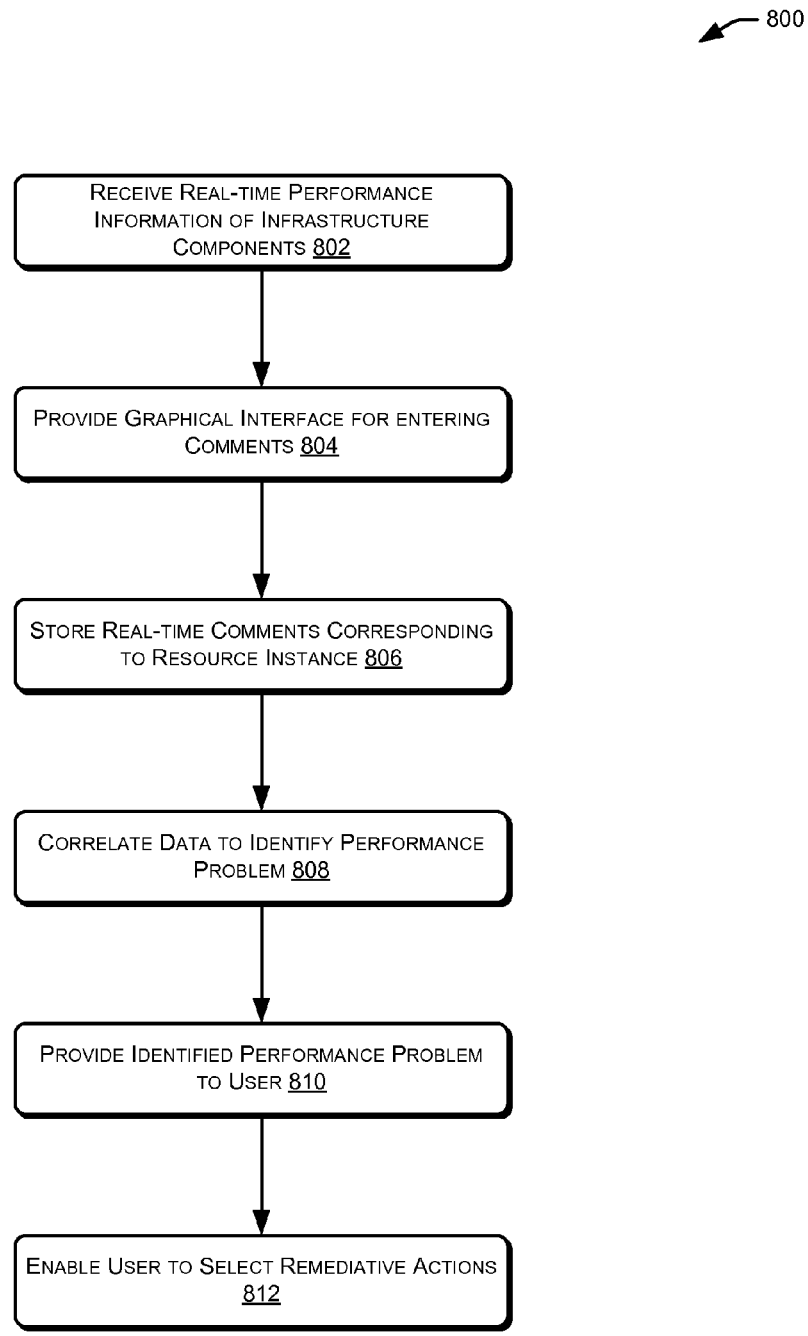

FIG. 8 illustrates an example flow diagram showing process 800 for providing notification and/or resolution of infrastructure issues. In some aspects, the one or more service provider computers 208 shown in FIG. 2 may perform the process 800 of FIG. 8. The process 800 may begin at 802 by receiving real-time performance information of an infrastructure component of a distributed system. As before, this real-time information may be received based at least in part on monitoring the infrastructure components of the distributed system. At 804, the process 800 may provide a graphical interface for entering one or more comments and/or questions associated with one or more resources of the distributed system. The process 800 may also store the real-time comments corresponding to resource instances at 806. Further, at 808, the process 800 may correlate the data to identify one or more performance problems (i.e., an issue). As noted above, correlating the data may help eliminate or reduce customer noise for instances when an issue does not actually exist (other than maybe a configuration issue with the customer). At 810, the process 800 may also provide the identified performance problem to a user. The identified performance problem may, in some cases, be proved in real-time prior to the user completing entrance of the comments and/or questions. The process 800 may end at 812 by enabling the user to select one or more remediative actions.

Figure 9:
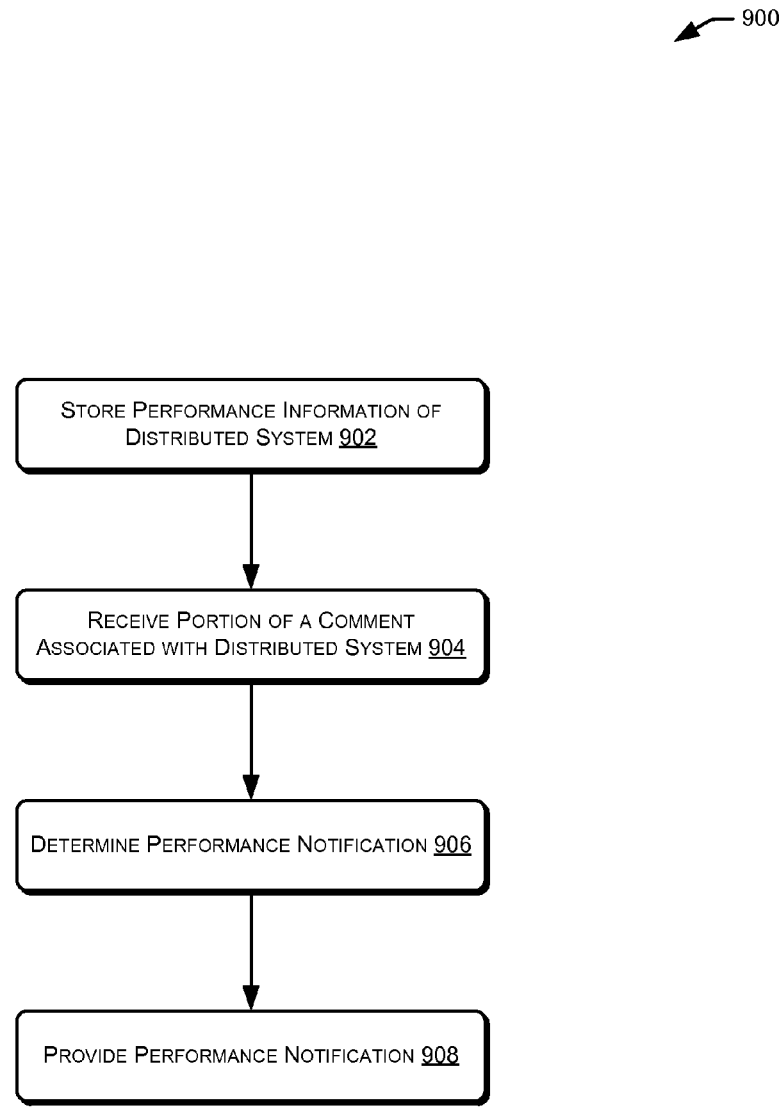

FIG. 9 illustrates an example flow diagram showing process 900 for providing notification and/or resolution of infrastructure issues. In some aspects, the one or more service provider computers 208 shown in FIG. 2 may perform the process 900 of FIG. 9. The process 900 may begin at 902 by storing performance information of a distributed system. At 904, the process 900 may receive a portion of a comment associated with the distributed system. That is, a user may input a comment into a user interface, and the process 900 may begin processing the comment before the entire comment has been entered. In this way, the process 900 may determine a performance notification at 906 based at least in part on the portion of the comment that has been entered. Additionally, the performance notification may also be based at least in part on the stored performance information and/or other comments from one or more different input channels or sources. Further, in some examples, correlation of the received and/or stored data may be performed in order to determine relationship between the data and/or to filter out noise of the system. The process 900 may then end at 908 by providing the performance notification to a user. The notification may be provided to the user via text message, email message, pop-up window or other user interface, private message, public message or the like.

Illustrative methods and systems for providing notification and/or resolution of infrastructure issues are described above. Some or all of these systems and methods may, but need not, be implemented at least partially by architectures and/or process such as those shown in FIGS. 1-9 above.

Illustrative Environments

Figure 10:
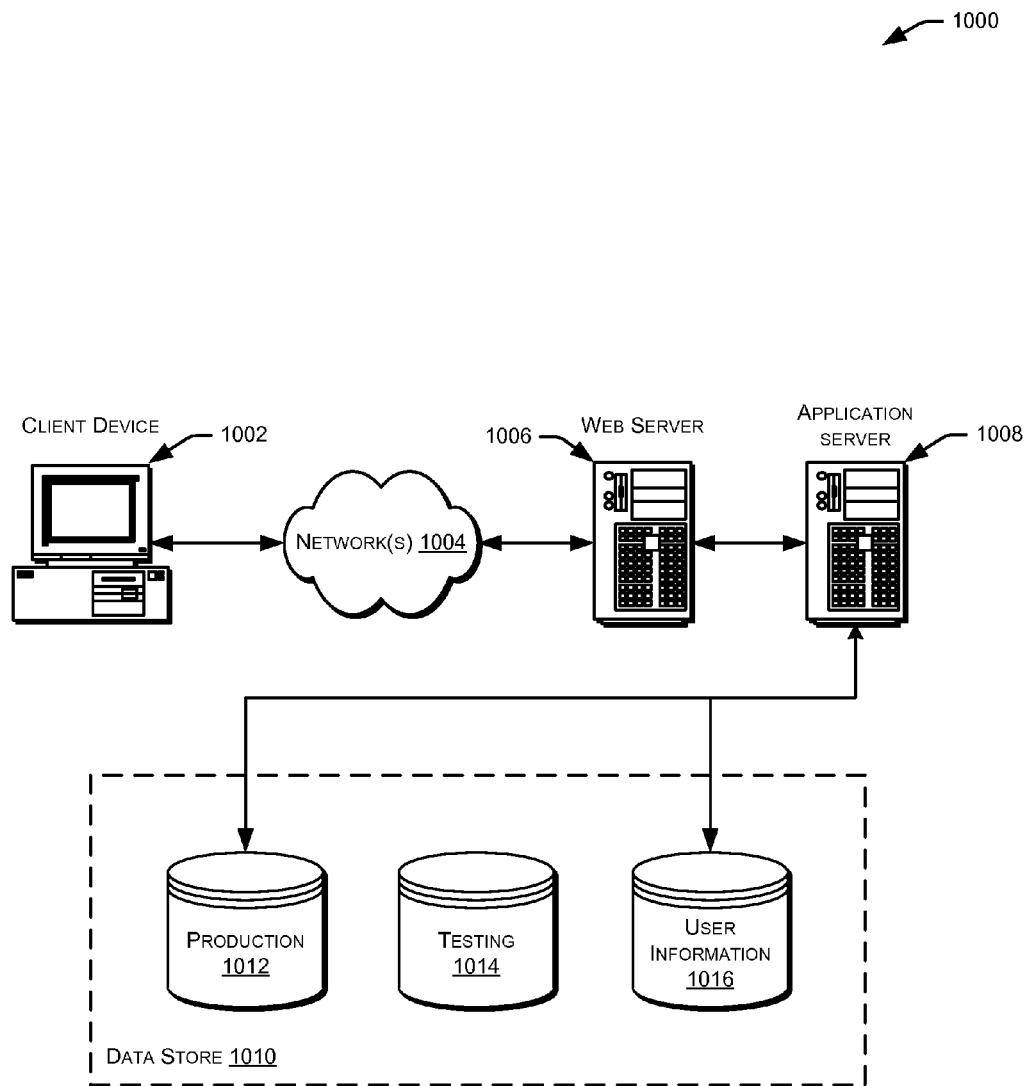
FIG. 10 illustrates an example block diagram of at least one environment in which various embodiments of features described herein can be implemented, according to at least one example.

FIG. 10 illustrates aspects of an example environment 1000 for implementing aspects in accordance with various embodiments of the present disclosure. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed, or clustered environment. The application server can include any appropriate hardware and computer-executable instructions for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the web server in the form of HTML, XML, or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser.

Each server typically may include an operating system that provides executable program instructions for the general administration and operation of that server, and typically may include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless and handheld devices running mobile applications and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically may include a number of computer-executable applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, computer instructions (including portable applications, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

Further, the example architectures, tools and computing devices shown in FIGS. 1-10 are provided by way of example only. Numerous other operating environments, system architectures and device configurations are possible. Accordingly, embodiments of the present disclosure should not be construed as being limited to any particular operating environment, system architecture or device configuration.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might" or "may," unless specifically stated otherwise, or otherwise understood within the context as used, is generally intended to convey that certain embodiments could include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for distributed system notifications, comprising:
   monitoring operating information of an infrastructure component that operates the distributed system;
   determining, based at least in part on the operating information, a health level of the infrastructure component;
   receiving, from a plurality of sources, information associated with operation of a resource instance of the distributed system;
   receiving a configuration setting associated with operation of the resource instance;
   in response to an indication that the health level of the infrastructure component is below a predefined level, identifying, based at least in part on the received information associated with operation of the resource instance and the determined health level, an infrastructure impairment affecting the resource instance;
   automatically remediating, based at least in part on the received configuration setting, the identified infrastructure impairment by modifying the operation of the resource instance; and
   providing, to a client entity associated with the resource instance, a notification of the identified infrastructure impairment.

2. The computer-implemented method of claim 1, wherein the infrastructure component comprises at least one of a server, a switch, a rack, a power circuit, a network interface, a machine host, a geographic area or a data center.

3. The computer-implemented method of claim 1, wherein the plurality of sources includes at least one of:
the client entity;
the resource instance;
a social media service; or
a third-party monitoring service.

4. The computer-implemented method of claim 1, wherein the health level is determined based at least in part on a number of non-responsive attempts to access the infrastructure component.

5. A computer-implemented method for distributed system issue notification, comprising:
receiving operating information associated with a component of the distributed system;
determining, based at least in part on the operating information, a level of health of the component;
receiving, from multiple sources, information associated with operation of an electronic resource of the distributed system, the electronic resource associated with a client entity, the client entity being a third-party computing device configured to resell the electronic resources;
in response to a triggering event, identifying, based at least in part on the received information associated with operation of the electronic resource, a component issue affecting the electronic resource;
providing a callable function configured to enable requesting of the information associated with the component issue, the triggering event including at least a request for the information associated with the component issue, the request based at least in part on the callable function; and
providing, to the client entity, information associated with the component issue.

6. The computer-implemented method of claim 5, wherein the component is configured to operate at least a portion of the distributed system.

7. The computer-implemented method of claim 5, wherein the triggering event includes at least one of:
the determined level of health being above a predefined level;
a predefined number of user comments; or
a correlation between the determined level of health and the user comments.

8. The computer-implemented method of claim 5, wherein the information associated with the component issue includes at least a notification of the component issue.

9. The computer-implemented method of claim 5, wherein the information associated with the component issue includes at least an indication of remediative measures taken, corresponding to the component, based at least in part on an account setting of the client entity.

10. The computer-implemented method of claim 5, further comprising enabling the client entity to select one or more remediative actions to be performed on the electronic resource.

11. A system for resource availability management of a distributed system, comprising:
at least one memory that stores computer-executable instructions; and
at least one processor configured to access the at least one memory, the at least one processor configured to execute the computer-executable instructions to:
receive information associated with management of the distributed system;
receive, from a plurality of channels, operating information associated with an electronic resource corresponding to a client entity of the distributed system, the plurality of channels including at least one of:
the electronic resource;
a monitor of the distributed system configured to monitor the electronic resource;
a social media service;
a third-party service configured to receive messages from or provide messages to the client entity; or
a user interface of the client entity, the user interface configured to provide customer comments indicating degradation of the electronic resource;
identify, in response to a trigger, a component function negatively affecting performance of the electronic resource; and
provide, to the client entity, information associated with the component function.

12. The system of claim 11, wherein the information associated with management of the distributed system includes at least information received from a server, a switch, a rack, a power circuit, a network interface, a machine host, a geographic area or a data center.

13. The system of claim 11, wherein the trigger comprises at least one of:
an indication of degraded service of the distributed system based at least in part on the received information associated with the management of the distributed system;
an indication of degraded service of the electronic resource based at least in part on the received operating information associated with the electronic resource; or
a co-relation between the received information associated with the management of the distributed system and content of customer comments.

14. The system of claim 11, wherein the at least one processor is further configured to execute the computer-executable instructions to automatically remediate the component malfunction by modifying a configuration of at least one of the distributed system or the electronic resource.

15. One or more non-transitory computer-readable media storing computer-executable instructions for distributed system issue notification that, when executed by one or more processors, configure the one or more processors to perform operations comprising:
determining, based at least in part on infrastructure information associated with the distributed system, a health level of the distributed system;
receiving, from multiple sources, information associated with operation of a computing resource;
receiving custom configurations associated with the operation of the computing resource; and
at a time after the health level of the distributed system is determined to be above a predefined level, providing an indication of the health level of the distributed system to a client entity associated with the computing resource based at least in part on the received information associated with operation of the computing resource and enabling the distributed system to automatically modify operation of the computing resource based at least in part on the received custom configurations.

16. The one or more non-transitory computer-readable media of claim 15, wherein the infrastructure information associated with the distributed system includes at least one of information from underlying services of the distributed system or information from at least one third-party channel.

17. The one or more non-transitory computer-readable media of claim 16, wherein the at least one third-party channel includes a social media service provider or a computing device of the client entity.

18. The one or more non-transitory computer-readable media of claim 15, wherein providing the indication of the health level of the distributed system includes at least one of providing private information associated with the health level in a private channel for the client entity or providing public information associated with the health level in a public channel for the client entity.

\* \* \* \* \*